United States Patent [19]
Valentas et al.

[11] 3,914,455
[45] Oct. 21, 1975

[54] FLAKED TEXTURIZED PROTEIN
[75] Inventors: Kenneth J. Valentas; Willibald M. Lindl, both of Minneapolis, Minn.
[73] Assignee: General Mills, Inc., Minneapolis, Minn.
[22] Filed: Jan. 16, 1974
[21] Appl. No.: 433,937

[52] U.S. Cl. ............... 426/447; 426/457; 426/511
[51] Int. Cl.² ........................................... A23J 3/00
[58] Field of Search ........... 426/142, 447, 511, 512, 426/457

[56] References Cited
UNITED STATES PATENTS
1,430,670  10/1922  Morgan et al. ..................... 426/142
3,682,647  8/1972  Bedenk et al. ................... 426/142 X
3,687,686  8/1972  Bedenk ........................... 426/142 X
3,754,926  8/1973  Strommer et al. .................. 426/511
3,814,824  6/1974  Bedenk et al. ................... 426/142 X

*Primary Examiner*—James R. Hoffman
*Attorney, Agent, or Firm*—Anthony A. Juettner; Gene O. Enockson; Norman P. Friederichs

[57] ABSTRACT

A method of preparing texturized protein material by treating the material in the presence of steam at an elevated gaseous pressure and an elevated temperature and then flaking the treated material.

5 Claims, 6 Drawing Figures

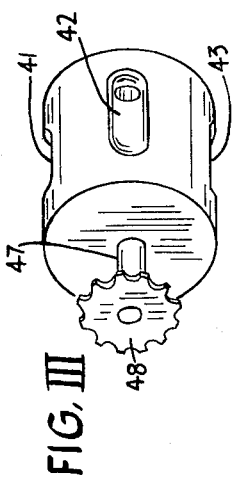
FIG. III
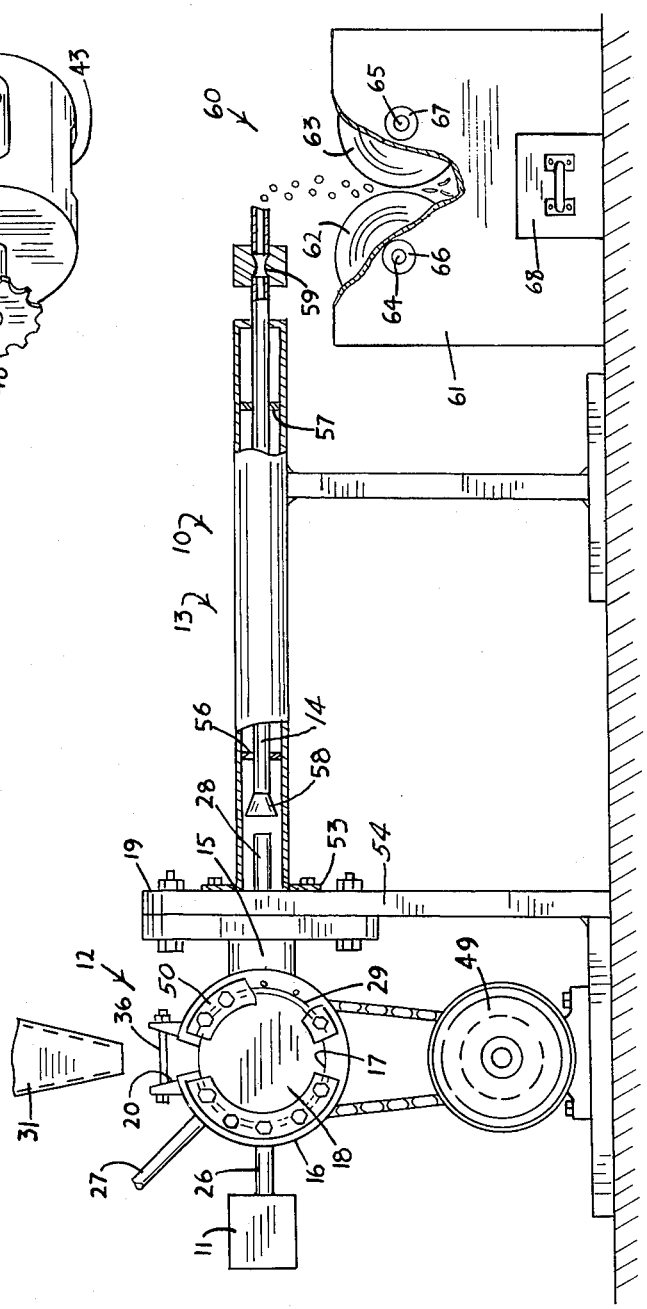
FIG. I
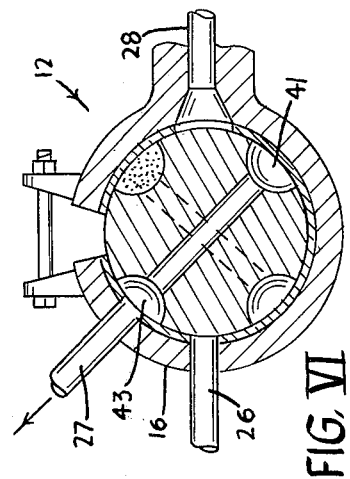
FIG. VI
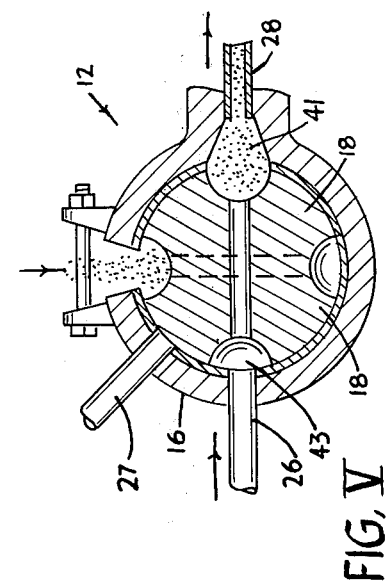
FIG. V
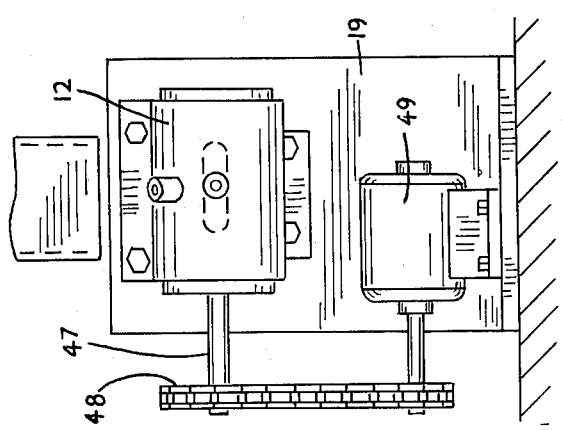
FIG. II
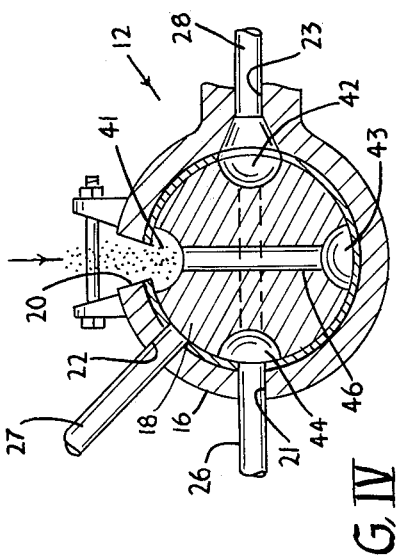
FIG. IV

FLAKED TEXTURIZED PROTEIN

BACKGROUND OF THE PRESENT INVENTION

The present invention relates to a method for treating food products and more particularly to a method for texturizing and flaking fine particulate protein food products.

In recent years substantial effort has been directed toward treating vegetable protein materials so as to provide such materials with textures and other characteristics commonly found in animal meat products. The vegetable protein materials are primarily soybean meal and flour, however, various other oil seed meals and flours also are used, such as peanut, cottonseed and sesame seed meals and flours. It is generally preferred to use protein concentrates of such oil seed meals, typically including at least about 50% protein by weight.

Various types of methods and apparatus have been used in the past to texturize the vegetable protein material. For example, solubilized soy protein has been extruded into an acid bath thereby forming texturized fibers. Untexturized protein material contains protein in discrete particles. Texturization takes place when the protein acquires a substantially continuous phase. The texturized material, when moist, is somewhat tough or chewy much like meat. The term "texturizing" as used herein will refer to the process of changing the discrete particles of protein into chunks having continuous phase protein.

THE PRESENT INVENTION

The present invention provides a new method for producing a texturized protein material including treating the material in a texturizing apparatus under a steam pressure and an elevated temperature and than flaking the treated material such as between a pair of flaking rolls.

The protein material in the present invention is treated under relatively mild conditions. For example, the residence time of the protein material in the apparatus of the present invention may be less than one second. The material being texturized in the present invention is not mechanically worked. Treatment of the protein material under such relatively mild conditions results in a texturized product having certain highly desirable characteristics. In particular, the product is quite bland.

The protein material to be processed according to the present invention may be of the type used in previous texturizing processes. This typically includes the various defatted oil seed meals and flours such as soybean, peanut, cottonseed and sesame. Various other untextured protein materials such as wheat gluten, yeast, sodium caseinate and the like may be texturized according to the present invention. The protein material used in the present invention is preferably a flour or flour-like material, particularly soybean flour. In its broader aspects the present invention relates to a process in which texturized expanded protein material is flaked.

Apparatus suitable for use in the present invention is shown in the drawings as follows:

FIG. 1 shows a side view of the apparatus with portions broken away.

FIG. 2 shows an end view of the apparatus.

FIG. 3 shows a portion of a valve of the apparatus.

FIGS. 4–6 show cross-sectional views of the valve in various positions of operation.

The texturizing apparatus 10 (FIG. 1) may include a rotary valve 12, a pressure tank 13 and a tube 14. The texturizing apparatus 10 is connected to a high pressure fluid source 11 such as a steam boiler which is capable of providing a fluid or stream pressure to the rotary valve 12 sufficient to texturize the protein material.

The rotary valve 12 may include a valve housing 16 with an opening or chamber 17 for reception of the rotary valve member or plug 18. The valve housing 16 has a base 15 for suppport of the valve 12 on bracket 19. The valve housing 16 has an upper opening 20 which serves as an inlet for material to be texturized. The housing 16 (FIG. 4) further includes openings 21, 22 and 23 for reception of pipes 26, 27 and 28, respectively. The pipes, for example, may be threaddely engaged in said openings. The pipe 26 is connected to the steam source 11 and feeds the pressurized steam to the valve 12. Pipe 27 is an exhaust pipe which depressurizes any residual stream pressure in valve 12 prior to feeding of protein material to the valve 12 through opening 20. Pipe 28 is the outlet through which protein material leaves valve 12. A hopper 31 (FIG. 1) may be provided for feeding protein material to opening 20 in valve 12. The housing 16 has a bearing member 29 located in chamber 17 for rotatable support of the valve member 18. The bearing member 29 extends substantially around chamber 17 except for suitable openings which cooperate with openings 20, 21, 22 and 23 in housing 16. The valve housing 16 has a tightening means such as a bolt or screw 36 for drawing the housing 16 and bearing 29 tightly against the rotary valve member 18 thereby providing a steam seal between bearing 29 and the rotary valve member 18. The bearing 29 may be constructed from a brass cylinder.

The rotary valve member 18 (FIGS. 2–6) may be of steel and may be constructed from a solid cylinder or alternatively it may be formed by casting. The member 18 is provided with any desired number of material conveying pockets such as 41, 42, 43 and 44. The member 18 will normally have an even number of such pockets, typically four, six or eight. A passageway 46 is provided between each pair of pockets such as pockets 41 and 43, for purposes hereinafter described. The rotary valve member 18 has a shaft 47 and a sprocket 48 for driven engagement with suitable power means such as motor 49 (FIG. 1). The valve member 18 may be held in position in housing 16 by restraining plates, such as plate 50 which is secured to housing 16 by screws.

The pressure tank or surge tank 13 and the tube 14 in the embodiment shown in FIG. 1 may be concentric pipes. The pressure tank 13 may be secured to the support bracket 19 by flange 53. The pressure tank 13 may be further supported by one or more legs such as leg 54. The pressure tank 13 is sealed from the atmosphere except through tube 14. The tube 14 is mounted in pressure tank 13 such as by spider flanges 56 and 57. If desired, a portion 58 of tube 14 nearest to valve 12 may be flared radially outwardly for ready reception of the protein material from pipe 28. Space is provided between the outermost edge of flared portion 58 and the adjacent wall of pressure tank 13 so that the pressure may equalize throughout tank 13.

The tube 14 may have a restricted orifice or nozzle 59 which limits the escape of pressure from the texturizing apparatus 10 thereby providing a build up of prpessure in tank 13. Alternatively, the diameter of the tube 14 may be sufficient restriction to provide the necessary build up of pressure. The restriction maintains a pressure in the pressure tank 13 sufficient to provide texturization of protein in the apparatus. An alternative type of nozzle may be used such as shown in U.S. Pat. Nos. 3,707,380, 3,776,470 or U.S. Pat. application, Ser. No. 433,936, filed Jan. 16, 1974.

The apparatus 10 includes a flaking section 60 having a support structure 61 and a pair of rotatably driven rolls 62 and 63. The support structure 61 may be constructed of plate metal. The rolls 62 and 63 may be of a type conventionally used in breakfast cereal (i.e. corn flake) production. The rolls 62 and 63 each have a shaft 64 and 65, respectively, which are rotatably supported in structure 61 such as by bearing members 66 and 67, respectively. The flaking rolls 62 and 63 may be suitably driven, for example, with an electric motor (not shown). The rolls 62 and 63 may be urged toward each other by a steel coil spring (not shown). Alternatively, hydraulic or pneumatic cylinders may be used instead of the steel spring. The flaking section may include a receptacle such as drawer 68 for collecting the flaked material.

The apparatus 10 may include a size reducing section such as a Fitz Mill or a Commitrol cutter. The size reducing section may be located between the nozzle 59 and the flaking section 60. Alternatively, the size reducing section may be located in the texturizing tube 14 as disclosed in patent application Ser. No. 407,750 filed Oct. 18, 1973, entitled "TEXTURIZING APPARATUS". Various other modifications may be made without departing from the scope of the present invention.

OPERATION OF THE INVENTION

The protein material may be added to the texturizing apparatus 10 such as through the hopper 31. If desired, suitable provision may be made for metering or controlling the amount of feed material passing through hopper 31. The feed material leaving hooper 31 falls through opening 20 in the housing 16 of valve 12 thus being deposited, for example, in pocket 41 as shown in FIG. 4. The valve member 18 may rotate in a clockwise direction such that pocket 41 aligns with pipe 28 and pocket 43 aligns with pipe 26 in FIG. 5. At that point, the residual pressure in tank 13 and the pressure from pipe 26 act on the protein material. The pressure exerted on the protein material is sufficient to provide texturization. Good texturization has been obtained at 30 p.s.i.g. and apparently some texturization has been obtained even at 15 p.s.i.g. The pressure will generally be at least 55 p.s.i.g., preferably 80 to 110 p.s.i.g. The pressure exerted through pipe 26 by the fluid source 11 should be enough greater than the pressure exerted by the tank 13 that the protein material is rapidly forced through pipe 28, tube or chamber 14 and nozzle 59. The fluid provided by source 11 may be a fluid with a high heat transfer coefficient such as steam or a mixture of such a fluid with other gaseous fluid, for example, a mixture of steam and air. It is postulated that the texturization takes place immediately upon application of the pressure to the protein material by force from both the steam pipe 26 and the surge tank 13. In any event, the protein material is texturized by the time it leaves the nozzle 59. Steam pressure continues to pass through valve 12 and pipe 28 for an instant following expulsion of the protein material from pipe 28. This raises the pressure of tank 13. Of course, some pressure is lost through the tube 14 and nozzle 59 for an instant following expulsion of the piece of protein from nozzle 59. However, the proper pressure may be maintained in tank 13 because of the controlled orifice size in nozzle 59. It has been found that the protein material fails to texturize appreciably if the back pressure from the pressure tank 13 is reduced to below 15 p.s.i.g. The valve member 18 continues to rotate, pocket 43 aligns with exhaust pipe 27 and residual pressure in pockets 41, 43 and passageway 46 is relieved. Pocket 43 then reaches the feed port and is loaded with material to be texturized. The operational process then continues as described with respect to texturization using the pocket 41. Texturization takes place using pockets 42 and 44 substantially as described with respect to pockets 41 and 43. The valve member 18 may be rotated at any desired speed depending upon such things as the size of the pockets, the number of pockets and the feed rate of protein material.

The texturized protein material leaving the nozzle 59 has an expanded structure and has a density that is substantially less than water as illustrated by the fact that the material floats on water. The expanded texturized protein material is then flaked such as between the rolls 62 and 63. If the material is flaked shortly after leaving nozzle 59 (i.e. while still pliable), no additional treatment is necessary prior to flaking. Even if the expanded texturized protein material has set and become friable, the material may still be flaked providing it is first conditioned. The material may be conditioned in a steam atmosphere, for example, at 150°F. for 20 minutes. Various other conditions may be used so long as the material becomes pliable prior to flaking. The conditioned material may be passed between the flaking rolls. The flaking rolls may be spaced to provide flakes of the desired thickness, typically, the flakes may be 0.002 to 0.010 inches in thickness. The flaking rolls may be at room temperature. In any event, the flaking rolls should not be so hot that the flakes stick to the rolls. The flaking rolls should not be so cold that the flakes become so fragile that significant fracturing occurs. The rolls rotate at a rate sufficient to handle commercially feasible amounts of flaked material yet slow enough that the material is flaked without significant fracturing. The pressure applied by the rolls to the protein material is adequate to flake the protein material.

The process of the present invention may be carried out using various starting materials and various operating conditions. The untextured protein may be a vegetable protein, such as soybean protein, a protist protein, such as yeast and other microbials, or animal proteins, such as casein. The untextured feed material may be a typical defatted oil seed flour such as soybean flour, it may be a concentrate such as a soybean concentrate, or an isolate such as a soybean isolate. A material having a protein content as low as 30 percent (dry weight basis) and as high as 95 percent has been satisfactorily texturized according to the present invention. It has been found the the degree of texturization increases as the protein content is increased. For most uses of textured protein contemplated by the present invention, the protein content should be at least 50%, preferably about 55 to 75%. The term "percent" as used herein will refer to percent by dry weight unless otherwise specified.

The maximum pressure used in carrying out the present invention is limited only by the particular apparatus used. In carrying out the invention using the apparatus shown in FIG. 1, pressures as high as 140 p.s.i.g. and as low as 15 p.s.i.g. have been used. It has been found that an increase in pressure generally results in an increase in texturization and/or expansion. The preferred pressure conditions of the present invention are at least 25 p.s.i.g., generally at least 55 p.s.i.g., typically 80 to 110 p.s.i.g. The temperature of the fluid is sufficient to provide texturization of the protein and preferably is at least 250°F.

Protein material, having a moisture content as low as 4 to 6 percent and as high as 40 percent by weight, has been texturized according to the present invention. Materials having moisture contents about 40 percent may be texturized according to the present invention; however, they tend to become sticky and difficult to handle. It has been found that increasing moisture content increases texturization. The maximum moisture content is believed to be limited only by the particular texturizing apparatus used. The range of moisture in the feed material is preferably between 16 and 26 percent and generally between 18 and 24 percent.

The present invention provides flaked textured protein having acceptable water holding capacity and acceptable texture. The water holding capacity of the textured protein is desirably in the range of 2 to 3 for most uses such as meat extending uses. The water holding capacity of the protein may be less in other uses, such as 1.5 in simulated beef chunks. The term "water holding capacity" as used herein refers to the total amount of water the protein material is able to hold and is determined by soaking the texturized protein in an excess of water for 20 minutes and then draining for 5 minutes. When the flaked protein material is placed in water it sinks to the bottom and hydrates more rapidly than unflaked material. The water holding capacity is equal to the wet weight minus the dry weight and that value divided by the dry weight.

Texture of the protein material may be measured in shear press values. Shear press values for texturized protein of the present invention will generally be in the range of 100 to 1500 pounds as determined by the following procedure. Sample is prepared for measurement by weighing out 75 grams (dry weight basis) of texturized protein material. The sample is placed in an excess of cold water and soaked at about 40°F. for 1.5 hours. The sample is drained for 5 minutes and divided into 3 equal parts by weight. The 3 parts are wrapped in plastic and allowed to stand at room temperature for 20 minutes. Each of the parts are tested in the Allo-Kramer Shear Press Ser. No. 1042, Model No.-5-2H) using a 10-bladed head according to conventional techniques using a 2500 pound ring and the three values are added together.

The textured protein of the present invention may be used for the same purposes and in substantially the same manner as previously known types of texturized protein. The flaked material may be finely chopped and impregnated with a conventional meat analog serum, thereby producing a simulated ground beef or simulated ground pork. For example, simulated ground beef may be prepared by mixing, by weight, about 3.5 parts beef tallow, 4.3 parts corn flour, 1.7 parts egg albumin, 1.2 parts brown sugar, 1.2 parts onion powder, 1.0 parts salt, 50 parts water, 24 parts texturized protein material, beef flavoring and sufficient caramel coloring to obtained the desired cooked hamburger color. The mixture may be heated to set the egg albumin. The flaked material may be suitably flavored and utilized to simulate various other materials such as sunflower seeds, onions, peppers and the like.

The flaked material may be further treated if desired. For example, it was unexpectedly discovered in the present invention that the flakes return substantially to the preflaked size and shape if they are rehydrated. Absent further treatment, the flakes readily rehydrate and if mixed with ground meat (e.g. ground beef), the material takes on coloring of the meat much better than previously known textured protein.

It was further discovered that the flakes can be made resistant to rehydration by toasting the flakes in a radiant energy oven. The flakes may be toasted in a radiant oven at 400°F. or 1 minute. In this instance, the flakes may be utilized as a high protein ready-to-eat breakfast cereal The following examples are illustrative of the present invention and are not intended for purposes of limitation.

EXAMPLE I

Texturized protein material was prepared according to the present invention from soy flour (Cargill Soy Flour) having a particle size of about 200 standard mesh. The total moisture content of the mixture was raised to 14% by weight. The moistened flour-like mixture was then fed at the rate of about 15 pounds per minute to texturizing apparatus constructed substantially as shown in FIGS. 1–6. The temperature of the steam fed to the valve 12 was 425°F. and the pressure of the steam fed to the apparatus was 145 p.s.i.g. The pressure in the apparatus was about 95 p.s.i.g. The material leaving the nozzle was well textured and had a moisture content of about 10%. The texturized material was size reduced using a Fitz Mill. The resulting material was found to have the following U.S.A. Sieve Series size characteristics by weight: About 0.3% had a + ¼ inch sieve size; 33.7% had a + No. 6 sieve size; 63.6% had a + No. 16 sieve size and 2.4% had a − No. 16 sieve size. The material was flaked between conventional flaking rolls. The temperature of the material during flaking was about 150°F. The two rolls each had a diameter of 40 inches and a length of 36 inches. The rolls rotated at a rate of 126 r.p.m. (revolutions per minute). The rolls were urged toward each other by hydraulic cylinders operated at a pressure of 600 p.s.i.g. The protein flakes were rehydrated later using tap water. The flakes were found to readily hydrate. The ratio, by weight, of flakes to water was 1:2. The flakes upon rehydration assumed a shape closely approximating that prior to flaking. The hydrated material was added to ground beef at an extension level of 25% based on the total weight of the mixture. A patty was formed and broiled in an oven. The product was found to be satisfactory.

EXAMPLE II

Texturized protein flakes were prepared as described in Example I. The flakes were subsequently toasted in a radiant oven at 400°F. for approximately one minute. The toasted flakes were mixed with milk and sugar. The mixture was eaten as a ready-to-eat cereal. The toasted flakes unexpectedly were found to be resistant to hydration.

EXAMPLE III

Toasted texturized protein flakes were prepared as described in Example II. The flakes were coated with vegetable oil and salted. The product had a taste, texture and mouthfeel resembling salted sunflower seeds.

EXAMPLE IV

Flakes were prepared as described in Example I except that the starting protein material was a mixture including 70% soy flour and 30% soy isolate. The flakes were sprayed with a solution of oleoresin onion concentrate (Resoleum Onion 50046 produced by McCormick & Co.) in ethyl alcohol. The flakes were then dried. Upon rehydration the flakes closely resembled real onion flakes. The hydrated flakes had a good onion taste and texture.

The embodiments of the invention in which an exclusive property or privilege is claimed are defined as follows:

1. A method for preparing a texturized, flaked protein material comprising: feeding fine particles of a protein material to a processing zone, said protein material containing at least 30 percent protein by dry weight and being capable of texturization, feeding a heated pressurized gaseous processing fluid including steam into said zone, the temperature of said fluid being at least 250°F. and thereby raising the pressure in said zone to at least 15 p.s.i.g., removing said protein matereial from said zone to a zone of lower pressure thereby texturizing and expanding said protein material and then flaking said texturized, expanded protein material while the protein material is in a pliable condition.

2. The method of claim 1 wherein said step of flaking is carried out immediately upon removal to said zone of lower pressure.

3. The method of claim 1 wherein said flaking is carried out by passing the protein material between a pair of rolls.

4. The method of claim 1 wherein said expanded protein material is conditioned prior to flaking, said conditioning comprising holding said protein material in a steam chamber until the protein material becomes pliable.

5. The method of claim 1 wherein said expanded, flaked protein material is treated in a radiant energy oven thereby making the flakes resistant to rehydration.

* * * * *